United States Patent [19]

Heim

[11] Patent Number: 4,529,660
[45] Date of Patent: Jul. 16, 1985

[54] LINER MATERIAL AND METHOD
[75] Inventor: Robert J. Heim, St. Croix Falls, Wis.
[73] Assignee: Precision Punch & Plastics Co., Minneapolis, Minn.
[21] Appl. No.: 262,482
[22] Filed: May 11, 1981
[51] Int. Cl.³ .................. B32B 27/40; B32B 15/00
[52] U.S. Cl. .................. 428/423.1; 193/2 R; 193/2 D; 428/423.9; 428/692; 428/900
[58] Field of Search .......... 428/900, 692, 423.1, 428/423.9; 193/2 R, 2 D

[56] References Cited
U.S. PATENT DOCUMENTS

| | | | |
|---|---|---|---|
| 3,111,728 | 11/1963 | Alderfer | 428/900 |
| 3,124,725 | 3/1964 | Leguillon | 428/900 |
| 3,908,065 | 9/1975 | Stigen | 428/900 |
| 4,254,139 | 3/1981 | Handrickson | 428/900 |

FOREIGN PATENT DOCUMENTS 2424201 12/1979 France ..................... 193/2 R

OTHER PUBLICATIONS

"Urethane Elastomers", *Modern Plastics Encyclo.*, p. 215, 1969–1970.
"Urethane Coatings", *Modern Plastics Encyclo.*, p. 174, 1969–1970.

*Primary Examiner*—Ellis P. Robinson
*Attorney, Agent, or Firm*—Orrin M. Haugen; Thomas J. Nikolai

[57] ABSTRACT

A laminated material and method, a liner using the material, and several methods of manufacturing the material.

1 Claim, 3 Drawing Figures

LINER MATERIAL AND METHOD

TECHNICAL FIELD

This invention relates to the field of mechanical engineering, and particularly to a method and means for improving the life of conveyors such as chutes and launders used in the grain and mining industries for carrying materials of an abrasive nature.

BACKGROUND OF THE INVENTION

In the grain industry much grain is transferred in chutes, by gravity or by conveyor flights. Similarly, in the taconite industry much ore is conveyed in chutes or launders.

Various materials such as steel and wood have been used to construct such transport means, which will hereinafter be referred to generally as "chutes", and it has been learned that most satisfactory life is obtained from steel chutes lined with an abrasion resistant material such as urethane. The urethane may be obtained in sheets, to secure to the insides of the chutes, and can be flexible if the chute has a curved surface. The problem of securing the liner to the chute has not been so satisfactorily solved. Most fasteners are subject to abrasion by the moving material being transported, even if the liner itself resists abrasion, and a considerable amount of fastener replacement requires a considerable amount of down-time for the chutes. Also, when the liner is worn there is a very considerable down-time required in unfastening and removing the old liners and refastening the new liners its place.

BRIEF SUMMARY OF THE INVENTION

The present invention comprises a laminated material having one surface of urethane or other abrasion resistent material, and the other surface of a plastic magnetic material, the surfaces being secured together by total area adhesion, molding, or similar techniques. Such material is to be supplied in sheets, which can be cut to size and simply be placed in a chute with the magnetic material in contact with the steel of the chute, whereupon the liner is held until replacement is required, no fasteners other than the magnetic field itself being needed. When replacement is required, the material can be peeled away from the steel without damage to the steel or removal of any fasteners, and new material can simply be laid in position.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views.

DESCRIPTION OF THE PREFERRED EMBODIMENT

Figure 1:
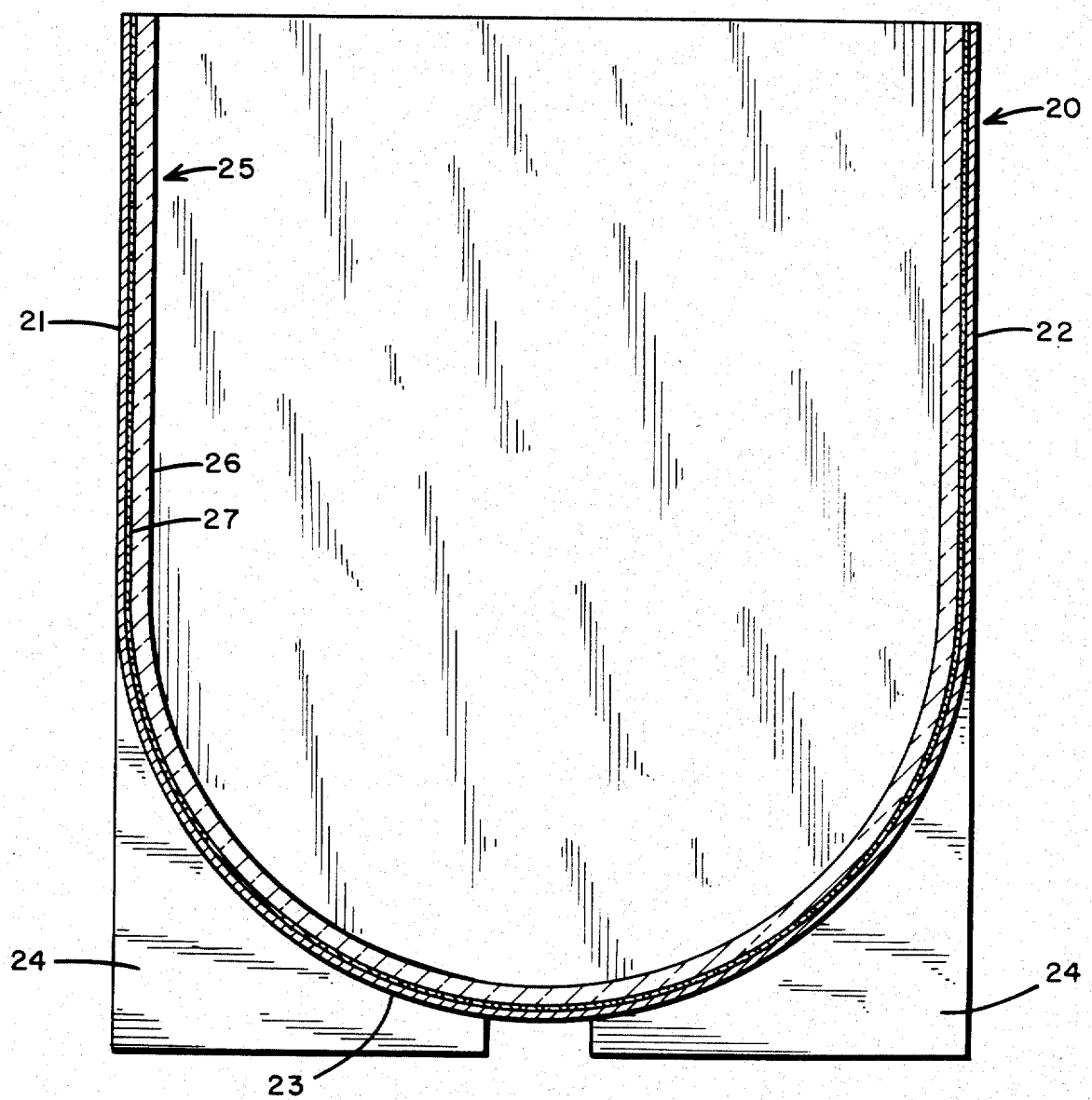
FIG. 1 is a sectional view of a chute in which a liner according to the invention is installed.

In FIG. 1 a steel chute 20 is shown having a pair of sidewalls 21 and 22 and a curved bottom 23 supported on brackets 24. The chute is provided with a liner 25 according to the invention, having an inner lamina 26 of urethane and an outer lamina 27 of plastic magnetic material such as "Plastiform" of Minnesota Mining and Manufacturing Company or "Koraseal," of B.F. Goodrich.

Figure 2:
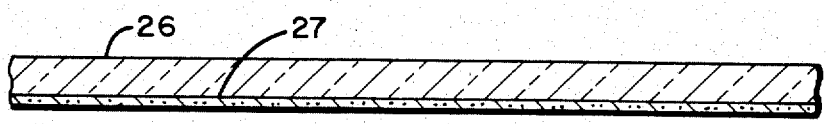
FIGS. 2 and 3 are sectional views of laminated products adapted for practice of the invention.
Figure 3:
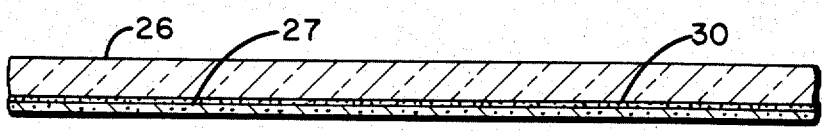

For convenient use in long chutes, liner 25 may be supplied in sheets. The urethane can be adhered to the plastic by open casting, or by extrusion, or alternatively may be sprayed on, to give essentially a two layer laminate as suggested in FIG. 2, the boundary between the two laminae being more or less distinct according to the method of manufacture. It is also possible to secure separate sheets of the two plastics together by an intermediary layer 30 of adhesive or double faced tape, as suggested in FIG. 3.

It has been found that under some circumstances magnetic plastic material gives greatest satisfaction when a ferromagnetic layer is integral with the face thereof remote from that which is to contact the metal supports, and magnetic plastic material in which such a layer is incorporated may be used in the present invention, to comprise layer 27 of the drawings, with the ferromagnetic layer next to lamina 26 or intermediary layer 30. The expression "plastic magnetic material" is intended to include material having such a layer.

To install the liner in the chute it is only necessary to press the magnetic surface against the steel chute wall, whereupon the liner is securely held against displacement by the moving contents of the chute. It has even been found that the liner adheres magnetically with sufficient strength to be used in lining chutes constructed of corrugated rather than flat sheet steel. If desired, the inner material may be cut to provide separate bottom and side sections, for ease in installation, the sections being simply butted together and held by magnetic attraction against the steel walls.

It should be pointed out that liner material according to the invention can be used to protect the inner surfaces of such devices as rotary drums, and can be applied to one or both faces of the flights of spiral conveyors. It is also within the spirit of the invention to line appropriate hollow molds with plastic magnetic material and then pour in liquid urethane until the desired liner thickness has been achieved.

From the foregoing it will be evident that the invention comprises an improved lining material for chutes and similar uses, in which a lamina of plastic magnetic material is adhered to a lamina of abrasion resistent urethane, and thereafter functions to secure the liner to any steel or iron surface without the need of any other fasteners, thus facilitating the installation of liners and their replacement when worn out.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. A liner for use in magnetically permeable conduits used for transporting abrasive materials for preventing damage to said magnetically permeable material which comprises an outer layer of flexible, plastic impregnated with a magnetic material for self-attachment to said magnetically permeable material and an inner layer of a tough, flexible, abrasive-resistant cast urethane material secured to substantially an entire surface of said plastic magnetic material.

* * * * *